United States Patent [19]

Lin

[11] 3,975,772

[45] Aug. 17, 1976

[54] DOUBLE SHIELDED MAGNETORESTIVE SENSING ELEMENT

[75] Inventor: Charles Chia-Hsiung Lin, San Jose, Calif.

[73] Assignee: International Business Machines Corporation, Armonk, N.Y.

[22] Filed: June 2, 1975

[21] Appl. No.: 583,226

[52] U.S. Cl. .................. 360/113

[51] Int. Cl.[2] .................. G11B 5/30; B11B 5/12

[58] Field of Search .................. 360/113

[56] References Cited

UNITED STATES PATENTS 3,908,194 9/1975 Romankiw .................. 360/113

*Primary Examiner*—Robert S. Tupper

*Attorney, Agent, or Firm*—James A. Pershon

[57] ABSTRACT

A magnetoresistive sensing element used for sensing magnetic transitions includes relatively thick shields and substantially thinner shields between the thick shields and the MR element. The output pulse waveform resulting from the MR element sensing a magnetic transition is improved permitting a higher linear density. The thick shields can comprise the legs of an inductive write transducer with the thin shields and MR element interposed for the read function. Another read/write head embodiment can include a separate write tranducer with the thin shields and the MR element placed between one of the legs of a write transducer and a third magnetic shield formed from either a thick magnetic layer or a magnetic substrate.

13 Claims, 4 Drawing Figures

34
30
24
28
22
16
10
18
26
32

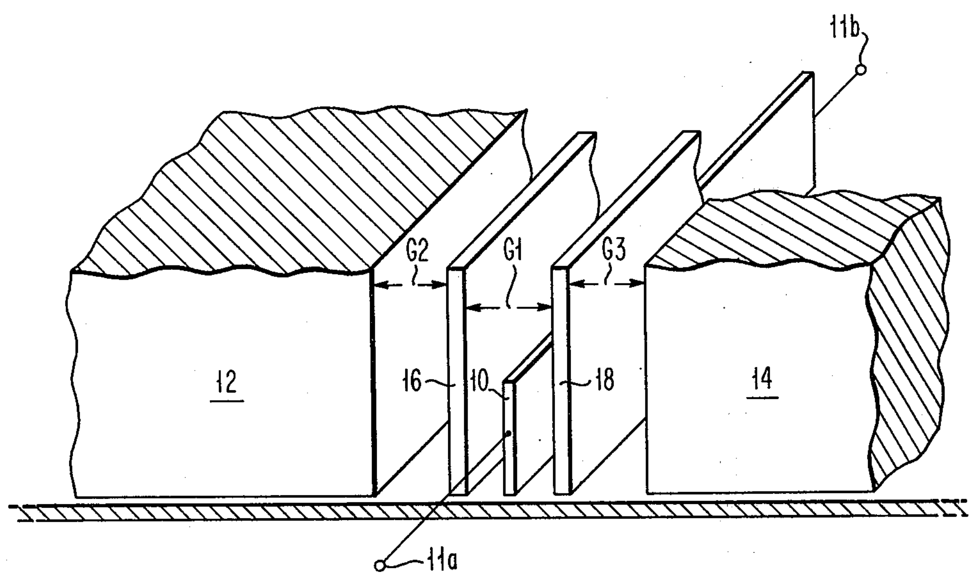
FIG. 1
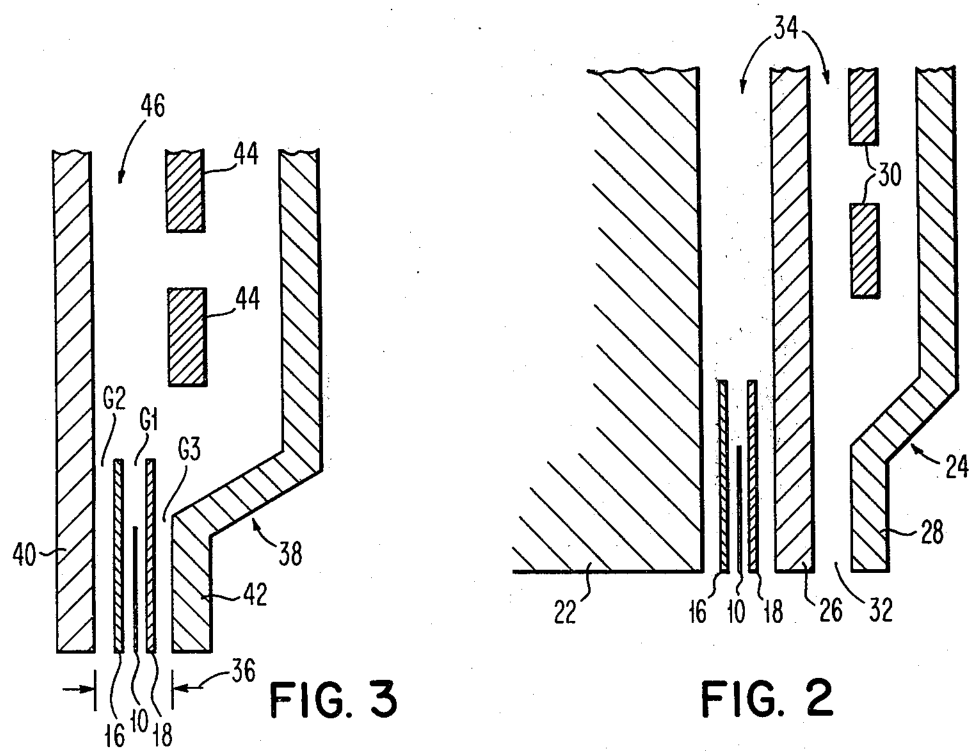
FIG. 3
FIG. 2

RELATIVE AMPLITUDE
1.0
0.9
0.8
0.7
0.6
0.5
0.4
0.3
0.2
0.1
0
X
1µm
2µm
3µm
4µm
20
A
B
C

DOUBLE SHIELDED MAGNETORESTIVE SENSING ELEMENT

BACKGROUND OF THE INVENTION

This invention relates generally to a transducer structure and more specifically to a transducer including a magnetoresistive element used to produce, detect or control production or detection of magnetic flux.

FIELD OF THE INVENTION

Magnetoresistive (MR) transducing elements are well known in the art. Further, the requirements of shielding to prevent interaction between readback pulses from adjacent magnetoresistive transducing elements and to limit the active sensing field of the MR element is also well known. Sensing transducers using MR elements has been developed and used to sense magnetic flux from a moving magnetic media such as tapes or disks and to sense the magnetic transitions of bubble domains.

It is highly desirable to use magnetoresistive elements in head assemblies for sensing recorded data. MR heads are thin and afford a savings in space and are adaptable to batch fabrication. Furthermore, the signal output of the MR element is substantially larger than that experienced with an inductive read transducer. However, MR elements are limited to reading data, and are not employed for recording or writing data. A useful feature would be to have a single head assembly incorporating the features of an MR transducer for reading while including elements to perform a write function.

DESCRIPTION OF THE PRIOR ART

An example of a prior art read/write head assembly using an MR element is disclosed by D. A. Nepela et al in a patent application Ser. No. 424,242 filed on Dec. 12, 1973, now U.S. Pat. No. 3,887,945 entitled "Head Assembly for Recording and Reading, Employing Inductive and Magnetoresistive Elements" and assigned to the same assignee as the present invention. That patent application discloses an MR element placed intermediate an inductive write transducer. Insulating members and bias conductors are placed between the MR element and the legs of an inductive write transducer. As in other prior art head assemblies, the only magnetic shielding given to the MR element is that provided by the legs of the inductive write transducer.

It is, therefore, an object of the present invention to provide a head assembly that is capable of both reading and writing data on a magnetic medium while providing additional shielding.

Further, transducers with MR elements have a lower resolution since an effective gap length in the read mode is computed between the thick magnetic shields and the MR element. This is especially true if the thick shields form the legs of a write transducer.

Another object of this invention, therefore, is to provide a head assembly that has a higher effective magnetic sensing resolution.

A problem arises in using an MR element in a combined read/write transducer in that the MR element becomes saturated during the writing operation. Therefore, a further object of this invention is to lower the effect of the write transducer on the MR element in a combined read/write head assembly.

SUMMARY OF THE INVENTION

In accordance with the present invention, a transducer head assembly incorporates an MR element with intermediate, relatively thinner, magnetic shields placed between the MR element and relatively thicker shields of the head assembly. At least one extra magnetic shielding layer is inserted in the head assembly to provide a further magnetic isolation between the MR element and the thick shields. The inner thin shields reduce the effective gap length for the sensing or read operations.

One adaptation of the present invention can be to use the thick layers of magnetic material of the inductive legs of a write transducer as the thick shields interposed between the legs of a writing element.

A second embodiment of a combined read/write head assembly includes a thick magnetic shield substrate and the two legs of magnetic material of an inductive write transducer. The MR element, together with the plurality of relatively thin magnetic shields disposed on both sides of the MR element, is placed between the substrate shielding and one leg of the write transducer.

An object of the present invention, therefore, is to provide an enhanced head assembly using a magnetoresistive element.

Another object of this invention is to provide interposed shielding between the MR element and its encompassing magnetic shielding in a transducer assembly.

These and other objects of the present invention will become apparent to those skilled in the art as the description proceeds.

BRIEF DESCRIPTION OF THE DRAWINGS

The various novel features of this invention, along with the foregoing and other objects, as well as the invention itself both as to its organization and method of operation, may be fully understood from the following description of illustrated embodiments when read in conjunction with the accompanying drawing, wherein:

FIG. 1 is a simplified representation of a magnetic head assembly made in accordance with this invention;

FIG. 2 is a side cross-sectional view of a combined read/write head assembly with the sensing transducer according to the present invention placed adjacent to the write transducer;

FIG. 3 is a side cross-sectional view of a second embodiment of a combined read/write head assembly with the sensing transducer placed between the write transducer legs.

DESCRIPTION OF THE PREFERRED EMBODIMENT

Figure 4:
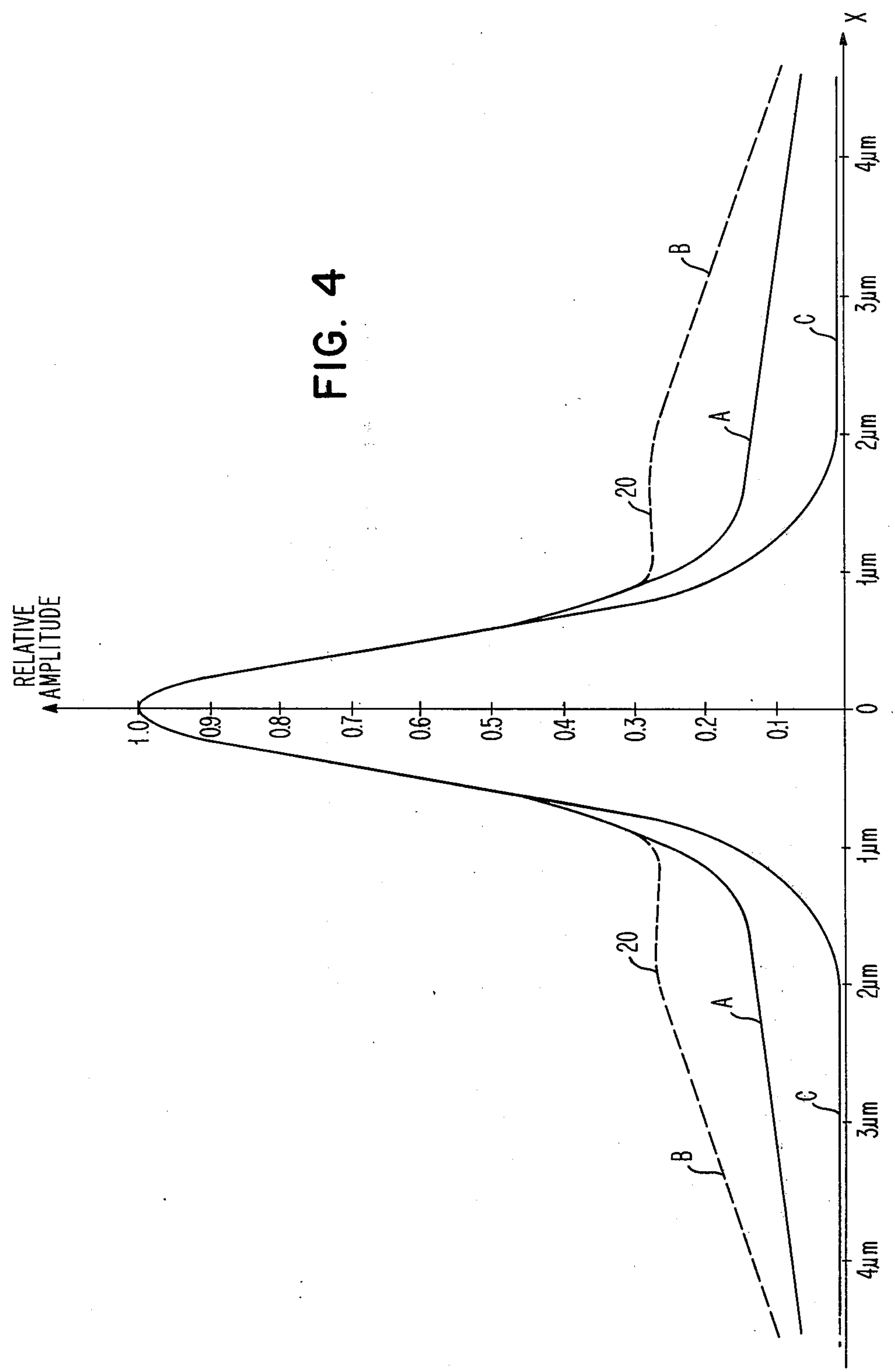
FIG. 4 is a graph showing a relative pulse output of an MR sensing transducer according to the prior art and the present invention as a function of relative distance from the MR element.

Referring to FIG. 1, a head assembly made in accordance with the present invention includes an MR element 10 disposed between thick magnetic shields 12 and 14, commonly ferrite substrates. Disposed between the MR element 10 and each thick shield 12 and 14 is a relatively thinner magnetic shield 16 and 18, respectively. The thick shield substrates are generally made of a highly permeable magnetic material and enclose the head assembly to prevent magnetic interferences from affecting the MR element and thereby producing an extraneously electrical pulse. The magnetic substrates 12 and 14 in the prior art provided the effective read/-gap for the MR element 10. The magnetic reluctance between the magnetic substrates 12 and 14 is held low in the back gap region by a suitable choice of dimensions. Alternately, the back gap can be closed if the magnetic substrate material is an electrically insulating ferrite material.

The MR element 10 includes conductive portions 11*a* and 11*b* at its ends, generally copper, which are attached electrically (not shown) to provide a means for sensing the resistance of the MR element 10. Magnetic insulating material is generally provided between the substrate shields 12 and 14, the thin shields 16 and 18, and the MR element 10. The assembly may be formed by evaporation techniques or other known methods onto one of the magnetic shield substrates. In this preferred embodiment, the MR element is centrally disposed between the thin shields 16 and 18 to ensure that a symmetrical pulse is obtained during readout. Further, the MR element is appropriately biased by any of the bias schemes presently well known in the art.

The thin shields 16 and 18 increase the linear density of the magnetic flux sensed by the MR element 10. FIG. 4 shows three relative amplitude curves versus distance obtained from the MR element. Curve A is a pulse output taken from an MR element with a prior art device, no thin shield members, at a standard flying height of approximately 0.5 microns. Curve B of FIG. 4 is a pulse output from an MR element with a prior art device, no thin interposed shields, at a very low flying height, less than 0.5 microns. Curve C is a pulse output with the same relative amplitudes as that of Curve A and B, taking at a flying height of 0.5 microns and less, with the addition of the thin shields 16 and 18 interposed between the MR elements and the thick outer shields 12 and 14 of FIG. 1.

The linear density of the prior art structure shown at curve A is less than optimum because of the relatively large output produced by the MR element in the leading and trailing portion of the output pulse. At zero position the magnetic flux transition is directly under the MR element and thus the relative amplitude is the highest. To the left and the right of this position is the relative output of the MR element as the flux transition approaches and departs from the MR element. The micron distances given are merely relative and depend upon the dimensions of the MR element, the gap between the thick magnetic shield, and the speed of the media relative to the MR element. The insignificant output from the MR head with the insertion of the thin shields is evident from curve C. Beyond a distance of two microns both on the approaching and trailing edge of the magnetic flux transition, the output from the MR element is insignificant, especially in relation to the curves A and B. If the MR element is producing an output signal from the next or previous magnetic transition, the transition directly under the MR element will have a shift of its peak signal resulting from the interference signal of the adjacent magnetic flux transition. The present invention increases the linear density in that adjacent flux transitions need not be as far apart to minimize the effect of the amplitude of the leading and trailing edge flux transition. This is especially true as the flying height is decreased as represented in curve B.

In curve B, the output pulse from the MR element 10 at a low flying height exhibits a secondary peak 20 on its leading and trailing edge. The secondary peak may cause a shift in the pulse output from the MR element to further degrade head performance.

Referring again to FIG. 1, the advantages of the present invention on the pulse output from the MR element 10 is accomplished by the addition of relatively thin magnetic shields 16 and 18 together with the outer thicker magnetic shields 12 and 14. One pair of thin magnetic shields 16 and 18 are shown in FIG. 1, but it is evident that a plurality of thin shields could be deposited between the MR element and the thick magnetic shields. The limit would be a practical one set by the required gap between the thick magnetic shields 12 and 14.

The inner gap G1 between thin shields 16 and 18 is to ensure a narrow output pulse. The thin shields 16 and 18 provide a higher output signal amplitude with lower extraneous signals. The thick outer shields 12 and 14 provide a favorable path for the magnetic flux from the magnetic transition once the transition is moving outside the thin inner shield, the gap G2 and G3. The thick shields 12 and 14 prevent the magnetic flux from entering the thin shields 16 and 18 and causing an output signal from the MR element 10. The separation of the thin shield 16 and 18 from their respective shields 12 and 14 by gaps G2 and G3 is to establish a high reluctance to prevent the MR element 10 from being disturbed as the magnetic transition is moving outside of the gap G1 region.

In FIG. 1 a typical MR element 10 has a thickness of from 200–600 angstroms. The thickness of the thin shields can be approximately five to ten times the width of the MR element and the thickness of the ferrite substrates 12 and 14 should be from 50 to 100 times the thickness of the MR element. The width of a typical gap G1 is 1 micron and the widths of the gaps G2 and G3 added together are typically equal to gap G1. A typical gap G2 or G3 width is 0.5 microns.

The utilization of the present invention to an inductive write, MR element sense head structure is shown in FIG. 2. The thin shield MR element 10 is placed between a ferrite substrate 22 and an inductive write head 24. The inductive write transducer 24 comprises two thick magnetic shields, legs 26 and 28. Conductor leads 30, typically formed from copper, activate the legs 26 and 28 of the inductive write head 24 to produce the magnetic transitions on the media (not shown) presented adjacent to the write gap 32. A magnetic and electrical insulative material 34 surrounds the components of the MR read transducer and the inductive write transducer to electrically insulate the electrical conductors 30 and to magnetically insulate the thin shields 16 and 18 from the MR element 10 and the associated thick shields, substrate 22 and leg 26 of the write head.

In the read/write head assembly shown in FIG. 2, the thick shields for the MR element are formed by the substrate 22 and the leg 26 of the inductive write head 24. The MR element 10 together with the thin shields 16 and 18 perform in the same manner described for FIG. 1. The thin shield 16 and 18 provide a further magnetic shield of the MR element 10 from the magnetic field produced by the inductive write head 24 during the production of magnetic transitions on the media. The substrate 22 can be formed from a ferrite block while the thin shields 16 and 18 and the write legs 26 and 28 can be formed from a Permalloy material.

Another embodiment of a combined read/write head assembly is shown in FIG. 3. In FIG. 3, the shielded MR element 10 is placed in the relatively wide write gap 36 of an inductive write head 38. The inductive write head 38 again comprises two write legs 40 and 42 encompassing a write conductor 44. As for FIG. 2, the thin shields 16 and 18 as well as the thick shields, write legs 40 and 42, can be formed from Permalloy. The conductors 44 can be copper and a magnetic and electrical insulation material 46 provides electrical and magnetic insulation between the separate elements.

The write legs 40 and 42 are used as the yoke during a write operation and as the outer thick magnetic shields for the MR element 10 during a read operation. The efficiency of the write head will be somewhat degraded by the existence of the inner thin shields 16 and 18, but the effect can be minimized by using relatively thin layers of magnetic material for the thin shields.

Thus, with the assembly of the present invention, during the read mode the MR element 10 senses the magnetic transitions appearing in the gap G1 between the thin shield 16 and 18. The thick outer shielding is provided by the inductive write legs 40 and 42. During the write mode, a fringe field is established between the write legs 40 and 42 by the conductors 44. The MR element 10 and the thin shields 16 and 18 are inactive during the write mode.

With the assembly disclosed herein, the signal that is written penetrates deeply into the recording medium, since writing is accomplished across the width of the gaps G1, G2 and G3. However, the reading is accomplished with an effective gap of half such width, gap G1.

Using the MR element in the combined read/write head structure according to the present invention provides a distinct advantage compared to inductive read and inductive write head. Thick separation layers are required between inductive read and inductive write elements. This separation layer requires long sputtering times to provide the prerequisite isolation between the read and write elements. The MR element and the inductive write structures of FIGS. 2 and 3 are immune to this magnetic coupling.

The principles of the present invention have now been made clear in an illustrative embodiment. There will immediately be obvious to those skilled in the art many modifications of structure, arrangement, proportions, the elements, materials and components used in the practice of the invention. For instance, the substrates 12 and 14 of FIG. 1 and the substrate 22 of FIG. 2 could be formed from thick layers of a Permalloy material as represented by the write legs 26 of FIG. 2 and write legs 40 and 42 of FIG. 3. It should be evident that the substrates are used for ease of construction of the assembly according to the disclosed embodiment. The substrates permit the vacuum deposition of the separate shields, elements and isolation layers to form the composite head assembly. The appended claims, are therefore, intended to cover and embrace any such modification, within the limits only of the true spirit and scope of the invention.

I claim:

1. A head assembly for reading magnetically recorded information from a medium comprising:

a magnetoresistive element;

means for sensing the resistance of said magnetoresistive element to read the magnetic information from the medium;

a plurality of magnetic sheets forming thin magnetic shields, at least one disposed spaced from and adjacent to each planar surface of said magnetoresistive element;

a plurality of highly permeable magnetic members each having a thickness dimension greater than said thin shields, at least one disposed spaced from and adjacent to said planar surface of said thin shields opposite to the planar surface facing said magnetoresistive element; and magnetic insulation disposed among said magnetoresistive element, said thin shields and said magnetic members.

2. A head assembly as defined in claim 1 wherein said highly permeable magnetic members include a first and a second highly permeable magnetic member, wherein said first magnetic member is a substrate of highly permeable magnetic material onto which the remaining parts of the head assembly are deposited, and said second magnetic member is a layer of highly permeable magnetic material.

3. A head assembly as defined in claim 2 wherein said first magnetic member is a slab of ferrite and said second magnetic member is a layer of Permalloy material.

4. A head assembly as defined in claim 2 further including a magnetic insulation layer disposed on the planar surface of said second magnetic member opposite to the planar surface facing said magnetoresistive element, a third highly permeable magnetic member disposed on said magnetic insulation layer, and including means for activating said second and third magnetic members to record magnetic information on a medium.

5. A head assembly as defined in claim 1 wherein said magnetic members form write legs of a recording transducer and the head assembly further includes means for selectively activating said magnetic members to record magnetic information on the medium.

6. A head assembly as defined in claim 1 wherein the thickness of the magnetic members is at least an order of magnitude thicker than any one of the thin magnetic sheets.

7. A head assembly as defined in claim 1 wherein the plurality of thin magnetic sheets is a pair of sheets.

8. A multilayer head assembly for reading and recording magnetically recorded information on a medium comprising:

a layer of magnetoresistive material for sensing magnetically recorded information while transversing the medium;

a plurality of thin magnetic shield layers disposed spaced from and adjacent to opposite planar surfaces of said magnetoresistive layer with at least one disposed adjacent each opposite planar surface of said magnetoresistive layer, said thin shield layers defining the effective read gap of the head assembly;

a pair of highly permeable magnetic members, one disposed spaced from and adjacent to each planar surface of said thin shield layers opposite to the planar surface facing said magnetoresistive layer, said magnetic members having a thickness dimension greater than said thin shield layers;

means for selectively activating said magnetic members to record magnetic information on the medium; and magnetic insulation disposed among said magnetoresistive layer, said thin shield layers and said magnetic members.

9. A head assembly as defined in claim 8 wherein said means for selectively activating said magnetic members is a coil which, together with said members, forms an inductive write transducer.

10. A head assembly for reading magnetically recorded information from a medium comprising:

a plurality of spaced apart highly permeable magnetic members;

a magnetoresistive element placed intermediate a first and a second of said magnetic members;

means for sensing the resistance of said magnetoresistive element to read the magnetic information from the medium;

a magnetic shield interposed between said magnetoresistive element and each of said first and second magnetic members, each shield having a thickness dimension much less than that of the magnetic members; and magnetic insulation disposed between said magnetoresistive element and said magnetic shields, and between said magnetic shields and said magnetic members.

11. A head assembly as defined in claim 10 wherein said first and second magnetic members form write legs of a recording transducer and the head assembly further includes means for selectively activating said magnetic members to record magnetic information on the medium.

12. A head assembly as defined in claim 10 further including:

a third highly permeable magnetic member disposed spaced from and adjacent the planar surface of said second magnetic member opposite to the planar surface facing the magnetic shield;

magnetic insulation placed between said third magnetic member and said second magnetic member; and means for activating said third magnetic member and said second magnetic member to record magnetic information on a medium.

13. A head assembly as defined in claim 10 wherein the gaps between the spaced apart magnetic shields and the magnetoresistive element, and between each magnetic shield and its associated adjacent magnetic member are essentially equal.

* * * * *